J. M. COCHRANE.
STEREOPTICON SLIDE.
APPLICATION FILED DEC. 15, 1916.
1,309,183. Patented July 8, 1919.
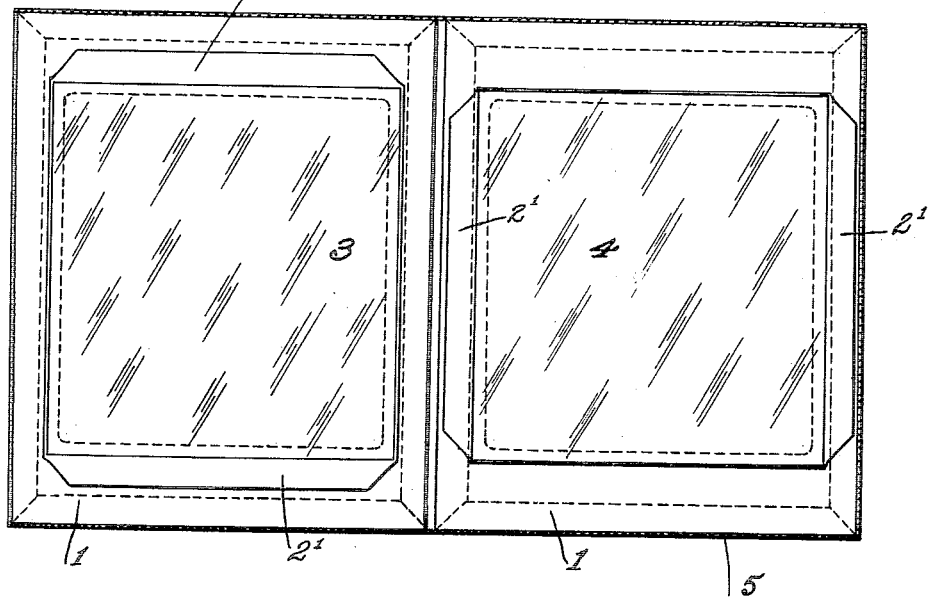
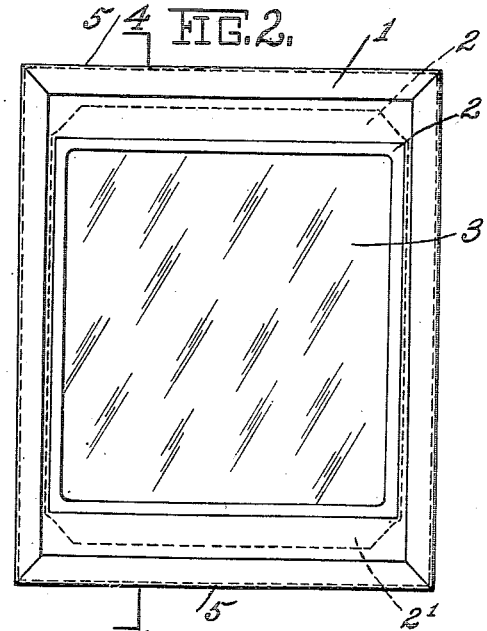
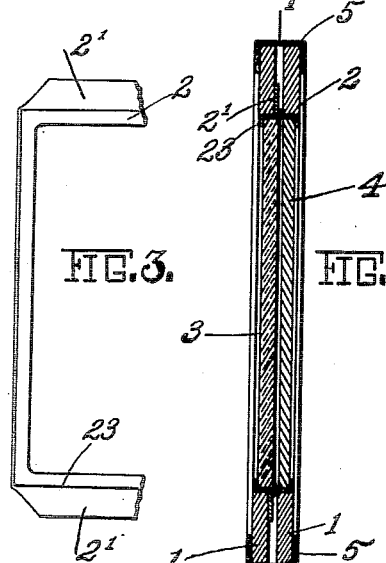
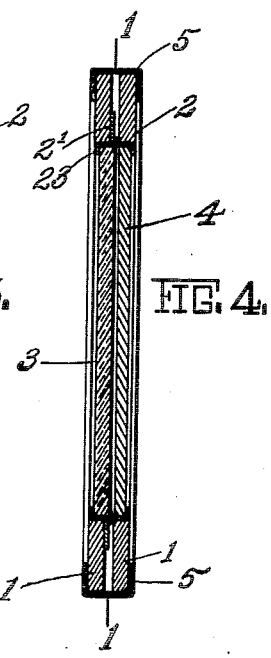
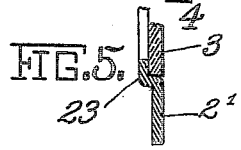
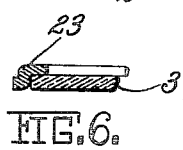
Inventor
Julian M. Cochrane
By Ellis Spear Jr.
Attorney

UNITED STATES PATENT OFFICE.

JULIAN M. COCHRANE, OF BOSTON, MASSACHUSETTS.

STEREOPTICON-SLIDE.

1,309,183.     Specification of Letters Patent.     Patented July 8, 1919.

Application filed December 15, 1916. Serial No. 137,233.

*To all whom it may concern:*

Be it known that I, JULIAN M. COCHRANE, a citizen of the United States, residing at Boston, county of Suffolk, Commonwealth of Massachusetts, have invented certain new and useful Improvements in Stereopticon-Slides, of which the following is a specification.

This invention relates to slides adapted for use in projecting apparatus, and particularly to a built-up slide in which a glass or other transparent medium bearing the view to be projected upon the screen is mounted between a pair of frame members.

Stereopticon slides as ordinarily used are commonly subjected to a considerable amount of handling both in trasportation and in exhibition. Slides used by lecturers or for lecture purposes ordinarily have to be transported from place to place either by shipment or carried in baggage by the lecturer or operator. The element of frangibility is therefore of great importance as well as the element of weight.

In addition to the matter of transportation it is to be borne in mind that the slides have to be handled rapidly by the operator under conditions of poor illumination frequently in close quarters and especially under conditions of heat, as the slides ordinarily in the presence of the source of illumination become hot and are frequently dropped or handled roughly on account of their heat.

It is therefore important that the slide be so constructed that the breakable member be made as small as possible, that it be embodied in a manner by which it will be least subjected to shock or other destruction or injury, and that at the same time it be so embodied that the heated transparency exposed to the source of light in the lantern will be suitably insulated both for its own protection and for the protection of the operator.

The physical limitations of the slide structure and the necessity for retaining the standard dimensions of the slide make impossible any elaboration as to either cushioning the transparency or insulating the slide itself. Moreover, it is desirable that the breakable member itself be kept at a uniform temperature throughout.

The objects of my present invention are to provide a slide which will be capable of ready handling with the minimum risk of injury and lighter in weight; which will enable the element of frangibility to be materially reduced without altering the standard dimensions; which will be less liable to be smooched or soiled on the picture area; and which will expose the minimum area of the glass or other picture carrying medium to the heat while maintaining the slide itself at full size.

For the purposes of illustration of my invention I have shown in the accompanying drawing a form of slide in accordance therewith which I have found satisfactory for use and capable of production on a practical basis.

In the drawings:

Figure 1 is a view of such a slide split and laid open to expose the interior faces.

Fig. 2 is a face view of the slide.

Fig. 3 is a portion of one of the inlay frames.

Fig. 4 is a section of the slide, and

Figs. 5 and 6 are sectional details of inlay frame and transparency.

In carrying out my invention I construct the slide of a pair of inclosing frame elements 1 of some light weight material as cardboard, having a cut-out portion or opening through which the picture is exposed. This opening is made of a size consistent with the least area necessary to properly project the picture in order to reduce weight and frangibility. Each frame element carries light metallic inlay frames 2 2, preferably of aluminum. These frames define a receiving recess in which the picture member proper 3 is mounted in a protected condition both as regards exposure to heat and liability of fracture. The metallic inlay frame elements 2 have marginal flanges $2^1$ which rest upon the adjacent edges of the cardboard frame elements at the display opening therethrough, to thereby protect the slide member by suitable adjacent rigidity and durability and yet permit a degree of expansion and contraction in the slide itself as well as to protect the margins of the cardboard inclosing members. The seats 23 for the slide member are offset with relation to the plane of the inner face of the cardboard elements so as to define a receiving recess of maximum width. The usual protecting cover glass 4 is also received and held by the inlay frames 2, 2.

In assembling, the transparency 3 and cover slide 4 are placed within the inlay frames 2, 2. These inlay frames are set with their bearing flanges 2¹ 2¹ oppositely disposed so as to engage and support all four sides of the inclosing members as appears in dotted lines in Figs. 1 and 2. The two halves as shown in Fig. 1 are then closed together and drawn tightly within a binding 5. This permits a compensation for any variation in the thickness of the glass members and allows them to be firmly held as in a cushion.

This enables me to provide a light mount for the picture members in a slide of standard thickness, without any material increase in the ultimate thickness of the slide itself, owing to the fact that the supporting flanges of metallic frames are set within the thickness of the cardboard frames themselves. The cardboard frames themselves are light and substantially non-conductors, so as to permit the slide to be removed from the machine without danger of burning the fingers.

Various modifications in the structural details of the elements and their manner of assembly may obviously be made without departing from the spirit of my invention if within the limits of the appended claims.

What I therefore claim and desire to secure by Letters Patent is:

1. A lantern slide comprising a transparency, a pair of opposing frame members and an inlay member, said inlay member having external seating flanges disposed to position the transparency within the plane of the marginal edges of the opposing frame members.

2. A lantern slide comprising a frangible picture element of less area than the slide, a surrounding member of less thermal conductivity and of greater thickness than the picture element, and comprising a pair of superimposed elements, a pair of inlay members each having a marginal portion disposed between said pair of superimposed elements and having flanged edges engaging the margins of the picture element.

3. A lantern slide comprising a pair of superimposed elements, a pair of inlay members each having a marginal portion disposed between said pair of superimposed elements and having flanged edges engaging the margins of the picture element.

4. A lantern slide comprising a pair of surrounding members each having an opening and substantially the size of the picture section, a pair of flanged inlay frames having their flanges disposed between said surrounding elements and each having an inwardly faced receiving flange, and a picture section having its margins disposed between the flanges of said inlay frames.

5. A lantern slide comprising a transparency, a pair of opposing frame members and an inlay member having relatively rigid flanges along opposite edges and said inlay member mounted to position said flanges as a continuous rigid binding about said transparency within said frame members.

6. A holder for a lantern slide comprising a transparency, a pair of opposing frame members, and a metallic inlay member, said inlay member having vertically disposed inturned seating flanges extending toward each other and disposed to position the transparency within the margins of said surrounding frame members, and having relatively rigid flanges extending away from each other and disposed between the frame members to provide a heat insulating binding.

7. A lantern slide comprising a frangible transparency, a pair of opposed contacting heat insulating frame members carrying inlay shoulders disposed to receive the transparency, said frame members being united.

In testimony whereof I affix my signature in presence of two witnesses.

JULIAN M. COCHRANE.

Witnesses:
VICTORIA LOWDEN,
AGNES V. O'CONNELL.